United States Patent [19]
Cowan

[11] Patent Number: 5,140,719
[45] Date of Patent: Aug. 25, 1992

[54] VEHICLE WINDOW CLEANING DEVICE

[76] Inventor: Errol Cowan, 1770 Avon Extended, Charlottesville, Va. 22901

[21] Appl. No.: 818,256

[22] Filed: Jan. 8, 1992

[51] Int. Cl.$^5$ ............................................. B60S 1/54
[52] U.S. Cl. .................................. 15/313; 15/250.001
[58] Field of Search ..................... 15/313, 250 R

[56] References Cited

U.S. PATENT DOCUMENTS

| 4,678,224 | 7/1987 | F'Geppert | 15/313 X |
| 5,097,563 | 3/1982 | Cowan | 15/313 |

FOREIGN PATENT DOCUMENTS

| 2338597 | 2/1975 | Fed. Rep. of Germany | 15/313 |
| 1468407 | 12/1966 | France | 15/313 |
| 8739 | 1/1981 | Japan | 15/313 |
| 71745 | 4/1987 | Japan | 15/313 |
| 269761 | 11/1988 | Japan | 15/313 |
| 24248 | 1/1990 | Japan | 15/313 |

Primary Examiner—Chris K. Moore
Attorney, Agent, or Firm—Walter F. Wessendorf, Jr.

[57] ABSTRACT

The vehicle window cleaning device replaces the windshield wipers. The device employs two electrically powered high-speed blowers, with high-impact exhaust air ducted to air nozzles to clear rainwater, water, moisture, debris and loose powder snow from the exterior surfaces of the windshield, right-side and left-side front and rear window, and the rear window, and from the mirrored surfaces of the right and left side view mirrors. One blower services the windshield, the right and left side-view mirrors, and the right-side and left-side front windows. The second blower services the rear window, and the right-side and left side rear windows.

6 Claims, 4 Drawing Sheets

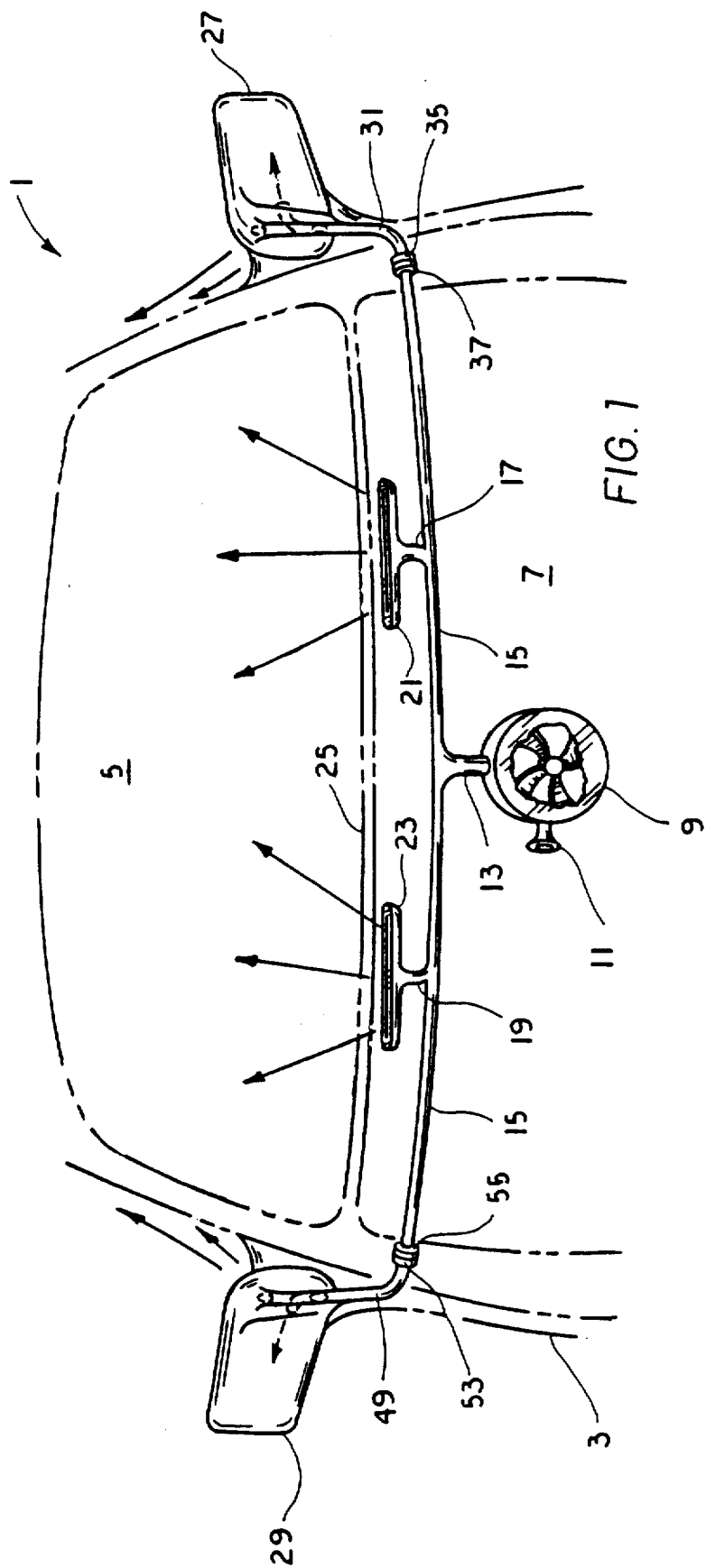

VEHICLE WINDOW CLEANING DEVICE

BACKGROUND OF THE INVENTION

1. Technical Field

This invention relates to a vehicle window cleaning device which replaces the windshield wipers and functions to clear any rainwater, water, moisture, debris or loose powder snow not only from the exterior surface of the windshield, but also from the left and right side-view mirrors and from the exterior surfaces of the left-side and right-side front and rear windows, and from the exterior surface of the rear window.

2. Background

The action of the windshield wiper arms in moving back and forth not only annoyingly distracts the driver's attention, but also impairs or interferes with his vision. Worn wiper blades are ineffective in clearing rainwater, water, moisture, debris or loose powder snow from the windshield's exterior surface; and have no clearing effect with respect to the left and right side-view mirrors and the exterior surfaces of the left-side and right-side front and rear windows, and the rear window, since wiper blades are not structurally employed therefor. And, regardless of the condition of the wiper blades, the oscillating blades eventually wear permanent annular grooves into the windshield's exterior surface that impair not only his vision; but also, during nighttime driving, with the headlights from oncoming vehicles, exacerbate the impairment of the driver's vision.

SUMMARY OF THE INVENTION

Accordingly, the objects of the invention are to contribute to the solution of the discussed problems of the art by providing a vehicle window cleaning device which replaces the windshield wipers. Electrically powered high-speed blowers, with high-impact exhaust air velocity, are ducted to air nozzles to clear not only the windshield but also the left and right side-view mirrors and the exterior surfaces of the left-side and right-side front and rear windows, and the rear window, of any rainwater, water, moisture, debris or loose powder snow. The blowers are powered by the vehicle's electrical system and are switch-controlled.

BRIEF DESCRIPTION OF THE DRAWINGS

These objects and other objects of the invention should be discerned and appreciated by the detailed descriptions of the preferred embodiments, taken in conjunction with the drawing figures, wherein like reference numerals refer to similar parts throughout the several views, in which: FIG. 1 is a front view of the invention.

DETAILED DESCRIPTIONS OF THE PREFERRED EMBODIMENTS

Figure 3:
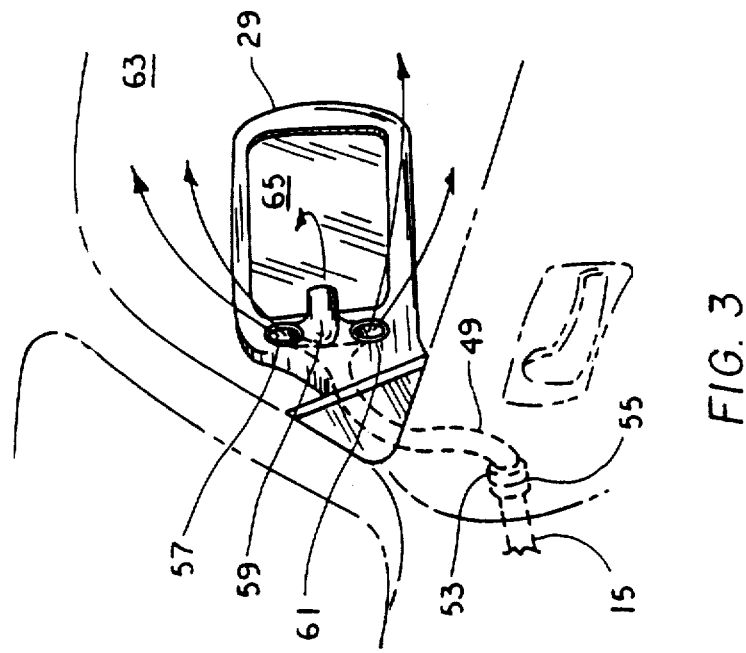
FIG. 3 is a view of the right side-view mirror.

In FIG. 1, reference numeral 1 generally refers to the invention. Shown in phantom lines are the vehicle 3, windshield 5 and firewall 7 of the engine compartment. An electrically powered high-speed blower 9 is appropriately mounted on the firewall 7. Air intake duct 11 and exhaust duct 13 communicate with the blower 9, with the exhaust duct 13 being tee-connected to the exhaust manifold 15. The exhaust manifold 15 has left and right manifold branches 17 and 19 which communicate with respective left-side and right-side air nozzles 21 and 23 which are disposed and located below the bottom 25 of the windshield 5 so that ambient air, drawn from the engine compartment through air intake duct 11 and forced by the operation of the blower 9 through the exhaust duct 13, will be directed upon and will impact, via air nozzles 21 and 23, the entire exterior surface of the windshield 5 with such tremendous force that any rainwater, water, moisture, debris or loose powder snow will be cleared from the exterior surface of the windshield 5. Shown are a left side-view mirror 27 and a right side-view mirror 29. A left trident branch 31, disposed through the frame of the left-side front door 33, carries on its terminal end an O-ring seal 35 which, when the door 33 is closed, mates with an O-ring seal 37, carried on the proximal terminal end of the exhaust manifold 15, disposed through the chassis frame for the left-side front door 33, and thereby establishes sealed communication between such proximal exhaust manifold and the left trident branch 31. The other end of the left trident branch 31 has top, middle and bottom air nozzles 39, 41 and 43. Ambient air, forced through the left trident branch 31, will be directed upon and will impact, via top and bottom air nozzles 39 and 43, the entire exterior surface of the left-side front door window 45 to similarly clear same of any rainwater, water, moisture, debris or loose powder snow; and with the middle air nozzle 41 directing and impacting forced ambient air upon the mirrored surface 47 of the left side-view mirror 27 to similarly clear same. A right trident branch 49, disposed through the frame of the right-side front door 51, carries on its terminal end an O-ring seal 53 which, when the door 51 is closed, mates with and O-ring seal 55, carried on the proximal terminal end of the exhaust manifold 15, disposed through the chassis frame for the right-side front door 51, and thereby establishes sealed communication between such proximal exhaust manifold and the right trident branch 49. The other end of the right trident branch 49 has top, middle and bottom air nozzles 57, 59 and 61. Ambient air, forced through the right trident branch 49, will be directed upon and will impact, via top and bottom air nozzles 57 and 61, the entire exterior surface of the right-side front door window 63 to similarly clear same of any rainwater, water, moisture, debris or loose powder snow; and with the middle air nozzle 59 directing and impacting forced ambient air upon the mirrored surface 65 of the right side-view mirror 29 to similarly clear same.

Figure 2:
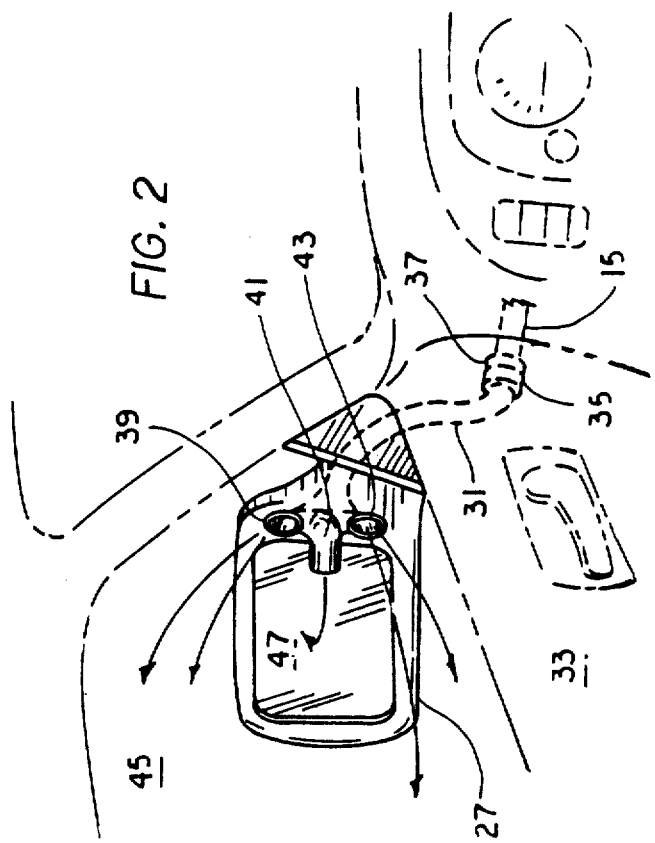
FIG. 2 is a view of the left side-view mirror.
Figure 4:
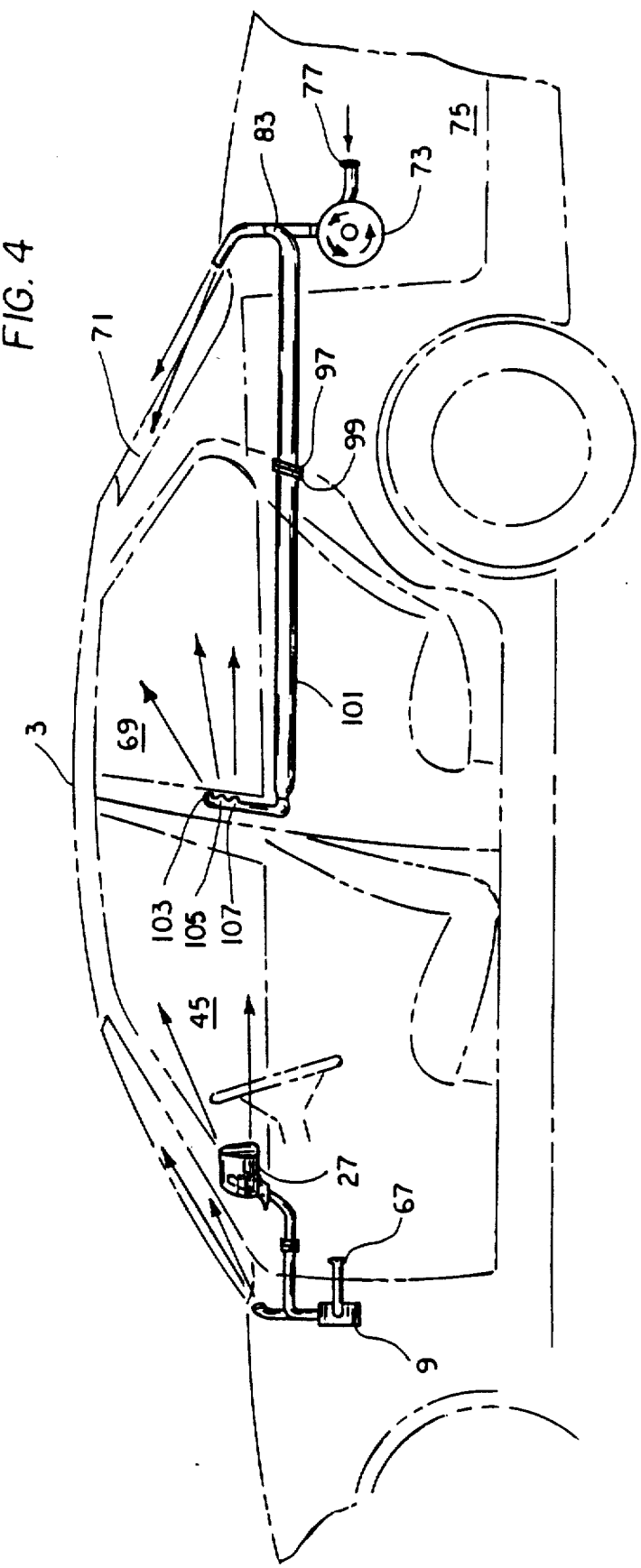
FIG. 4 is a side elevational view.

In FIG. 4, the device 1 has the same structure as shown and described with reference to FIGS. 1-3, with the exception that, instead of employing the air intake duct 11 to draw ambient air from the engine compartment, an air intake duct 67 is optionally employed to draw ambient air from the passenger compartment.

Further shown in FIG. 4 are the left-side rear window 69 and the rear window 71. An electrically powered high-speed blower 73 is appropriately mounted in the rear compartment 75 of the vehicle 3. An air intake duct 77 communicates with the blower 73; and an exhaust duct 79 communicates directly with the blower 73 and is connected in communicative relationship, as shown more discernably in FIG. 6, both to an air nozzle 81 and to an exhaust manifold 83. Upon operation of the blower 73, ambient air, drawn from the rear compartment 75 through the air intake duct 77 and forced by the blower 73 through the exhaust duct 79, will cause such forced ambient air to be directed upon and impact, via air nozzle 81, the entire exterior surface of the rear window 71 with such tremendous force that any rainwater, water, moisture, debris or loose powder snow will be cleared from the exterior surface of the rear window 71. The air nozzle 81 is disposed and located below the bottom 85 of the exterior surface of the rear window 71. Ambient air, forced through the air nozzle 81, is directed through a vehicle body opening 87 which, when the blower 73 is not in operation, is closed and sealed by a spring-biased flapper valve 89. When the blower 73 is in operation, the force of the ambient air being directed through the air nozzle 81 and vehicle body opening 87 opens the flapper valve 89; and, upon cessation of the operation of the blower 73, the restoring force of the spring component of the spring-biased flapper valve 89 causes the flapper valve 89 to close and seal the vehicle body opening 87.

Figure 6:
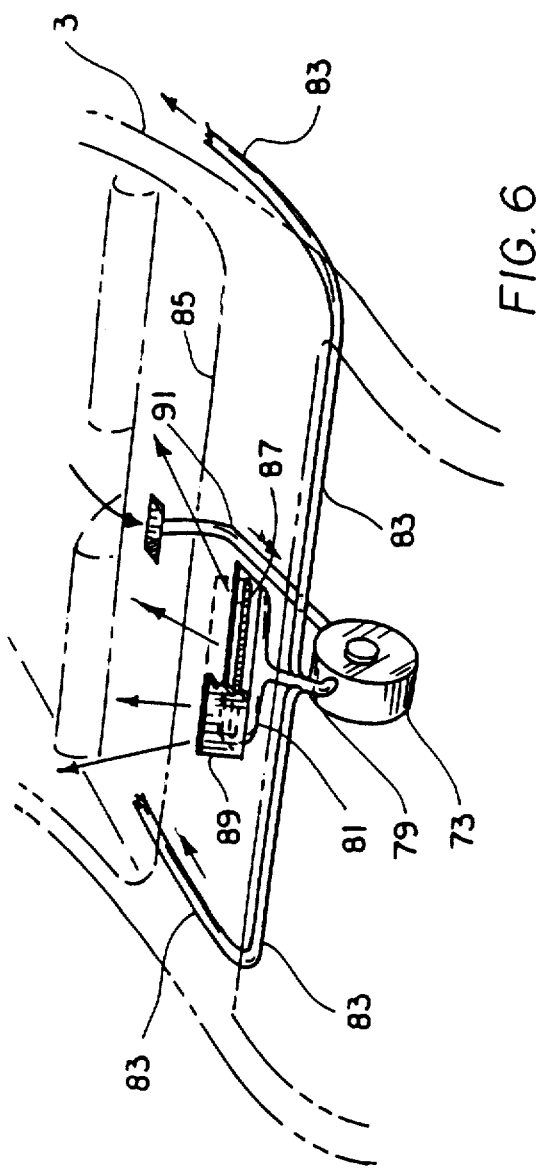
FIG. 6 is a view looking from the rear of the vehicle.
Figure 5:
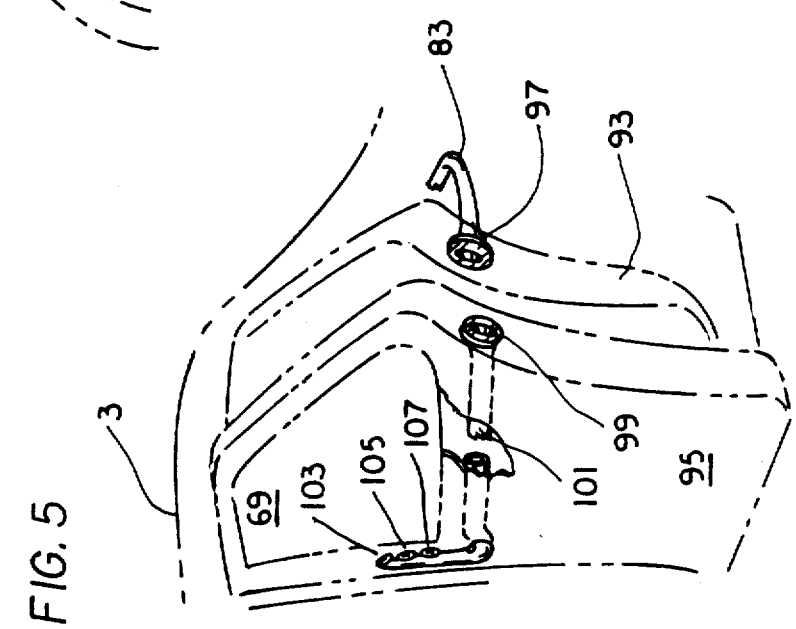
FIG. 5 is a view showing the left-side rear door open.

It should be noted that the structure, shown in FIGS. 4–6 and already described, and to be described with reference to FIGS. 4–6, for the clearing of rainwater, water, moisture, debris and loose powder snow from the left-side rear window, the right-side rear window and the rear window, is the same with the exception of the optional structure of the air intake duct 91, shown in FIG. 6. Instead of employing the air intake duct 77 to draw ambient air from the rear compartment 75, the air intake duct 91, communicating with blower 73, may be substituted to draw ambient air from the passenger compartment of the vehicle 3.

Hence, ambient air can be drawn by the blower 9 from the engine compartment via the air intake duct 11 and ambient air can be drawn by the blower 73 from the rear compartment via the air intake duct 77; in another embodiment, ambient air can be drawn by the blower 9 from the passenger compartment via the air intake duct 67 and ambient air can be drawn by the blower 73 from the passenger compartment via the air intake duct 91; in another embodiment, ambient air can be drawn by the blower 9 from the engine compartment via air intake duct 11 and ambient air can be drawn by the blower 73 from the passenger compartment via air intake duct 91; and in a final embodiment, ambient air can be drawn by the blower 9 from the passenger compartment via air intake duct 67 and ambient air can be drawn by the blower 73 from the rear compartment via the air intake duct 77.

The exhaust manifold 83 angles around within the interior of the left side of the vehicle's body, as shown, to the chassis frame 93 for the left-side rear door 95 and terminates with a ring-like seal 97 where it communicates in sealing relationship with a similarly configured ring-like seal 99 at one end of an exhaust branch 101, flattened to run interiorly and without interference within the left-side rear door envelope and then outward through the exterior body of the left-side rear door 95 and thence upwardly to terminate in top, middle and bottom air nozzles 103, 105 and 107. Communication of the exhaust manifold 83 with the exhaust branch 101 is only established when the left-side rear door 95 is closed.

The same structure of the seals 97 and 99, the flattened exhaust branch 101, and the top, middle and bottom air nozzles 103, 105 and 107 is employed for the right-side rear door. Hence, ambient air forced through the exhaust manifold 83 will cause the nozzles 103, 105 and 107 to similarly clear the exterior surfaces of both the left-side and right-side rear windows of rainwater, water, moisture, debris and light powder snow.

Figure 7:
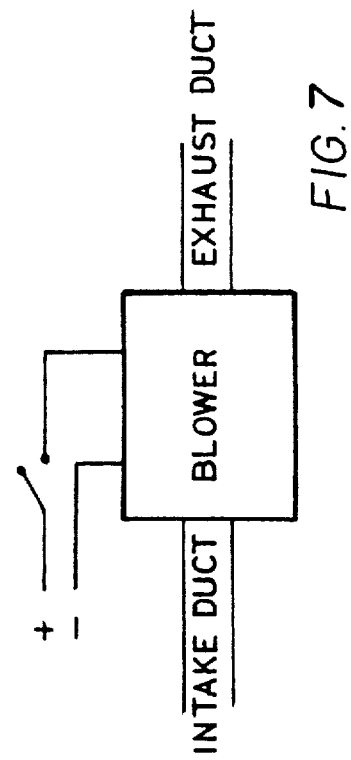
FIG. 7 is a block diagram of the high-speed blower powered by the vehicle's electrical system that is switch-controlled.

With reference to the block diagram shown in FIG. 7, either one switch can be mounted on the dash to control the operation of both blowers 9 and 73, or two separate switches can be utilized to individually control the operation of the blowers 9 and 73.

It is to be understood that, in addition to an automobile, the device can be used with other vehicles, such as a bus, truck, or boat, without departing from the intended field of applicability of the invention.

I claim:

1. A vehicle window cleaning device for use with a vehicle having a passenger compartment and having a windshield with an exterior surface and a bottom, the vehicle window cleaning device acting upon the entire exterior surface of the windshield to clear any rainwater, water, moisture, debris or loose powder snow from the entire exterior surface of the windshield; the vehicle window cleaning device comprising electrically powered high-speed blower means, air intake duct means, exhaust duct means and air nozzle means; said air intake duct means being in communication with the interior of the passenger compartment and communicating with said blower means, said exhaust duct means communicating with said blower means and with said air nozzle means, said air nozzle means being disposed below the bottom of the exterior surface of the windshield, said air intake duct means allowing ambient air to be drawn into the blower means from the passenger compartment, said blower means forcing such ambient air with tremendous force through the exhaust duct means and from the air nozzle means to act upon and impact the entire exterior surface of the windshield to clear any rainwater, water, moisture, debris or loose powder snow from the entire exterior surface of the windshield.

2. A vehicle window cleaning device for use with a vehicle having a passenger compartment and having a windshield with an exterior surface and a bottom, left and right side-view mirror means having mirrored surface, and left-side and right-side front windows having exterior surfaces, the vehicle window cleaning device acting upon the entire exterior surface of the windshield, the entire mirrored surfaces of the mirror means and the entire exterior surfaces of the front windows to clear any rainwater, water, moisture, debris or loose powder snow therefrom; the vehicle window cleaning device comprising electrically powered high-speed blower means, air intake duct means, exhaust duct means, windshield air nozzle means, and left and right side-view-mirror air nozzle means; said air intake duct means being in communication with the interior of the passenger compartment and communicating with said blower means, said exhaust duct means communicating with the blower means and with the windshield and side-view-mirror air nozzle means, said windshield air nozzle means being disposed and located below the bottom of the exterior surface of the windshield, said left an right side-view-mirror means mounting said left and right side-view-mirror air nozzle means, respectively, said air intake duct means allowing ambient air to be drawn into the blower means from the passenger compartment, said blower means forcing such ambient air with tremendous force through the exhaust duct means and from each of the windshield, and left and right side-view-mirror, air nozzle means, with the ambient air forced from the windshield air nozzle means acting upon and impacting the entire exterior surface of the windshield to clear any rainwater, water, moisture, debris or loose powder snow therefrom, and with the ambient air forced from the left and right side-view-mirror air nozzle means acting upon and impacting the entire mirrored surfaces of the respective left and right side-view-mirror means, and acting upon and impacting the entire exterior surfaces of the left-side and right-side front windows to clear any rainwater, water, moisture, debris or loose powder snow from the entire mirrored surfaces and entire exterior surfaces of the respective left-side and right-side front windows.

3. A vehicle window cleaning device for use with a vehicle having a windshield with an exterior surface and a bottom, left and right side-view mirror means having mirrored surfaces, left-side and right-side front windows having exterior surfaces, left-side and right-side lateral rear windows having exterior surfaces, a rear window with an exterior surface and a bottom, and the vehicle having an engine compartment and a rear compartment, the vehicle window cleaning device acting upon the entire exterior surfaces of the windshield, of the left-side and right-side front windows, of the left-side and right-side lateral rear windows, of the rear window and of the mirrored surfaces of the left and right side-view mirror means to clear any rainwater, water, moisture, debris or loose powder snow therefrom; the vehicle window cleaning device comprising electrically powered first high-speed blower means, electrically powered second high-speed blower means, first air intake duct means, second air intake duct means, first exhaust duct means, second exhaust duct means, windshield air nozzle means, left and right side-view-mirror air nozzle means, left and right side lateral rear-window air nozzle means, and rear-window air nozzle means; the first air intake duct means being disposed in the engine compartment of the said vehicle and communicating with the first blower means, the first exhaust duct means communicating with the first blower means and with the windshield, and left and right side-view-mirror, air nozzle means, the windshield air nozzle means being disposed and located below the bottom of the exterior surface of the windshield, the left and right side-view mirror means mounting the left and right side-view-mirror air nozzle means, respectively, the first air intake duct means allowing ambient air to be drawn into the first blower means from said engine compartment, the first blower means forcing such ambient air with tremendous force through the first exhaust duct means and from each of the windshield, and left and right side-view-mirror, air nozzle means, with the ambient air forced from the windshield air nozzle means acting upon and impacting the entire exterior surface of the windshield to clear any rainwater, water, moisture, debris or loose powder snow therefrom, and with the ambient air forced from the left and right side-view-mirror air nozzle means acting upon the impacting the entire mirrored surfaces of the respective left and right side-view-mirror means, and acting upon and impacting the entire exterior surface of the left-side and right-side front windows to clear any rainwater, water, moisture, debris or loose powder snow from the entire mirrored surfaces and the entire exterior surfaces of the left-side and right-side front windows, the second air intake duct means being disposed in the rear compartment and communicating with the second blower means and with the rear-window air nozzle means, and with the left and right side lateral rear-window air nozzle means, the rear-window air nozzle means being disposed and located below the bottom of the exterior surface of the rear window, the second air intake duct means allowing ambient air to be drawn into the second blower means from the rear compartment, the second blower means forcing such ambient air with tremendous force through the second exhaust duct means and from each of the rear-window, and lateral left and right rear-window, air nozzle means, with the ambient air forced from the rear-window air nozzle means acting upon and impacting the entire exterior surface of the rear window to clear any rainwater, water, moisture, debris or loose powder snow therefrom, and with the ambient air forced from the lateral left and right rear-window air nozzle means acting upon and impacting the entire exterior surfaces of the respective left-side and right-side lateral rear windows to clear any rainwater, water, moisture, debris or loose powder snow therefrom.

4. A vehicle window cleaning device for use with a vehicle having a windshield with an exterior surface and a bottom, left and right side-view mirror means having mirrored surfaces, left-side and right-side front windows having exterior surfaces, left-side and right-side lateral rear windows having exterior surfaces, a rear window with an exterior surface and a bottom, and the vehicle having a passenger compartment for its passengers, the vehicle window cleaning device acting upon the entire exterior surfaces of the windshield, of the left-side and right-side front windows, of the left-side and right-side lateral rear windows, of the rear window and of the mirrored surfaces of the left and right side-view mirror means to clear any rainwater, water, moisture, debris or loose powder snow therefrom; the vehicle window cleaning device comprising electrically powered first high-speed blower means, electrically powered second high-speed blower means, first air intake duct means, second air intake duct means, first exhaust duct means, second exhaust duct means, windshield air nozzle means, left and right side-view-mirror air nozzle means, left and right side lateral rear-window air nozzle means, and rear-window air nozzle means; the first air intake duct means communicating with the interior of the passenger compartment and communicating with the first blower means, the first exhaust duct means communicating with the first blower means and with the windshield, and left and right side-view mirror, air nozzle means, the windshield air nozzle means being disposed and located below the bottom of the exterior surface of the windshield, the left and right side-view mirror means mounting the left and right side-view-mirror air nozzle means, respectively, the first air intake duct means allowing ambient air to be drawn into the first blower means from the passenger compartment, the first blower means forcing such ambient air with tremendous force through the first exhaust duct means and from each of the windshield, and left and right side-view-mirror, air nozzle means, with the ambient air forced from the windshield air nozzle means acting upon and impacting the entire exterior surface of the windshield to clear any rainwater, water, moisture, debris or loose powder snow therefrom, and with the ambient air forced from the left and right side-view-mirror air nozzle means acting upon the impacting the entire mirrored surfaces of the respective left and right side-view-mirror means, and acting upon and impacting the entire exterior surfaces of the left-side and right-side front windows to clear any rainwater, water, moisture, debris or loose powder snow from the entire mirrored surfaces and the entire exterior surfaces of the left-side and right-side front windows, the second air intake duct means communicating with the interior of the passenger compartment and communicating with the second blower means and with the rear-window air nozzle means, and with the left and right side lateral rear-window air nozzle means, the rear-window air nozzle means being disposed and located below the bottom of the exterior surface of the rear window, the second air intake duct means allowing ambient air to be drawn into the second blower means from the passenger compartment, the second blower means forcing such ambient air with tremendous force through the second exhaust duct means and from each of the rear-window, and lateral left and right rear-window, air nozzle means, with the ambient air forced from the rear-window air nozzle means acting upon and impacting the entire exterior surface of the rear window to clear any rainwater, water, moisture, debris or light powder snow therefrom, and with the ambient air forced from the lateral left and right rear-window air nozzle means acting upon and impacting the entire exterior surfaces of the respective left-side and right-side lateral rear windows to clear any rainwater, water, moisture, debris or loose powder snow therefrom.

5. A vehicle window cleaning device for use with a vehicle having a windshield with an exterior surface and a bottom, left and right side-view mirror means having mirrored surfaces, left-side and right-side front windows having exterior surfaces, left-side and right-side lateral rear windows having exterior surfaces, a rear window with an exterior surface and a bottom, and its having an engine compartment and a passenger compartment, the vehicle window cleaning device acting upon the entire exterior surfaces of the windshield, of the left-side and right-side front windows, of the left-side and right-side lateral rear windows, of the rear window and of the mirrored surfaces of the left and right side-view mirror means to clear any rainwater, water, moisture, debris or loose powder snow therefrom; the vehicle window cleaning device comprising electrically powered first high-speed blower means, electrically powered second high-speed blower means, first air intake duct means, second air intake duct means, first exhaust duct means, second exhaust duct means, windshield air nozzle means, left and right side-view-mirror air nozzle means, left and right side lateral rear-window air nozzle means, and rear-window air nozzle means; the first air intake duct means being disposed in the engine compartment of the said vehicle and communicating with the first blower means, the first exhaust duct means communicating with the first blower means and with the windshield, and left and right side-view-mirror, air nozzle means, the windshield air nozzle means being disposed and located below the bottom of the exterior surface of the windshield, the left and right side-view mirror means mounting the left and right side-view-mirror air nozzle means, respectively, the first air intake duct means allowing ambient air to be drawn into the first blower means from said engine compartment, the first blower means forcing such ambient air with tremendous force through the first exhaust duct means and from each of the windshield, and left and right side-view-mirror, air nozzle means, with the ambient air forced from the windshield air nozzle means acting upon and impacting the entire exterior surface of the windshield to clear any rainwater, water, moisture, debris or loose powder snow therefrom, and with the ambient air forced from the left and right side-view-mirror air nozzle means acting upon the impacting the entire mirrored surfaces of the respective left and right side-view-mirror means, and acting upon and impacting the entire exterior surfaces of the left-side and right-side front windows to clear any rainwater, water, moisture, debris or loose powder snow from the entire mirrored surfaces and the entire exterior surfaces of the left-side and right-side front windows, the second air intake duct means communicating with the interior of the passenger compartment and communicating with the second blower means and with the rear-window air nozzle means, and with the left and right side lateral rear-window air nozzle means, the rear-window air nozzle means being disposed and located below the bottom of the exterior surface of the rear window, the second air intake duct means allowing ambient air to be drawn into the second blower means from the passenger compartment, the second blower means forcing such ambient air with tremendous force through the second exhaust duct means and from each of the rear-window, and lateral left and right rear-window, air nozzle means, with the ambient air forced from the rear-window air nozzle means acting upon and impacting the entire exterior surface of the rear window to clear any rainwater, water, moisture, debris or light powder snow therefrom, and with the ambient air forced from the lateral left and right rear-window air nozzle means acting upon and impacting the entire exterior surfaces of the respective left-side and right-side lateral rear windows to clear any rainwater, water, moisture, debris or loose powder snow therefrom.

6. A vehicle window cleaning device for use with a vehicle having a windshield with an exterior surface and a bottom, left and right side-view mirror means having mirrored surfaces, left-side and right-side front windows having exterior surfaces, left-side and right-side lateral rear windows having exterior surfaces, a rear window with an exterior surface and a bottom, and the vehicle having a passenger compartment and rear compartment, the vehicle window cleaning device acting upon the entire exterior surfaces of the windshield, of the left-side and right-side front windows, of the left-side and right-side lateral rear windows, of the rear window and of the mirrored surfaces of the left and right side-view mirror means to clear any rainwater, water, moisture, debris or loose powder snow therefrom; the vehicle window cleaning device comprising electrically powered first high-speed blower means, electrically powered second high-speed blower means, first air intake duct means, second air intake duct means, first exhaust duct means, second exhaust duct means, windshield air nozzle means, left and right side-view-mirror air nozzle means, left and right side lateral rear-window air nozzle means, and rear-window air nozzle means; the first air intake duct means communicating with the interior of the passenger compartment and communicating with the first blower means, the first exhaust duct means communicating with the first blower means and with the windshield, and left and right side-view mirror, air nozzle means, the windshield air nozzle means being disposed and located below the bottom of the exterior surface of the windshield, the left and right side-view mirror means mounting the left and right side-view-mirror air nozzle means, respectively, the first air intake duct means allowing ambient air to be drawn into the first blower means from the passenger compartment, the first blower means forcing such ambient air with tremendous force through the first exhaust duct means and from each of the windshield, and left and right side-view-mirror, air nozzle means, with the ambient air forced from the windshield air nozzle means acting upon and impacting the entire exterior surface of the windshield to clear any rainwater, water, moisture, debris or loose powder snow therefrom, and with the ambient air forced from the left and right side-view-mirror air nozzle means acting upon the impacting the entire mirrored surfaces of the respective left and right side-view-mirror means, and acting upon and impacting the entire exterior surfaces of the left-side and right-side front windows to clear any rainwater, water, moisture, debris or loose powder snow from the entire mirrored surfaces and the entire exterior surfaces of the left-side and right-side front windows, the second air intake duct means being disposed in the rear compartment and communicating with the second blower means and with the rear-window air nozzle means, and with the left and right side lateral rear-window air nozzle means, the rear-window air nozzle means being disposed and located below the bottom of the exterior surface of the rear window, the second air intake duct means allowing ambient air to be drawn into the second blower means from the rear compartment, the second blower means forcing such ambient air with tremendous force through the second exhaust duct means and from each of the rear-window, and lateral left and right rear-window, air nozzle means, with the ambient air forced from the rear-window air nozzle means acting upon and impacting the entire exterior surface of the rear window to clear any rainwater, water, moisture, debris or light powder snow therefrom, and with the ambient air forced from the lateral left and right rear-window air nozzle means acting upon and impacting the entire exterior surfaces of the respective left-side and right-side lateral rear windows to clear any rainwater, water, moisture, debris or loose powder snow therefrom.

* * * * *